Patented Aug. 13, 1929.

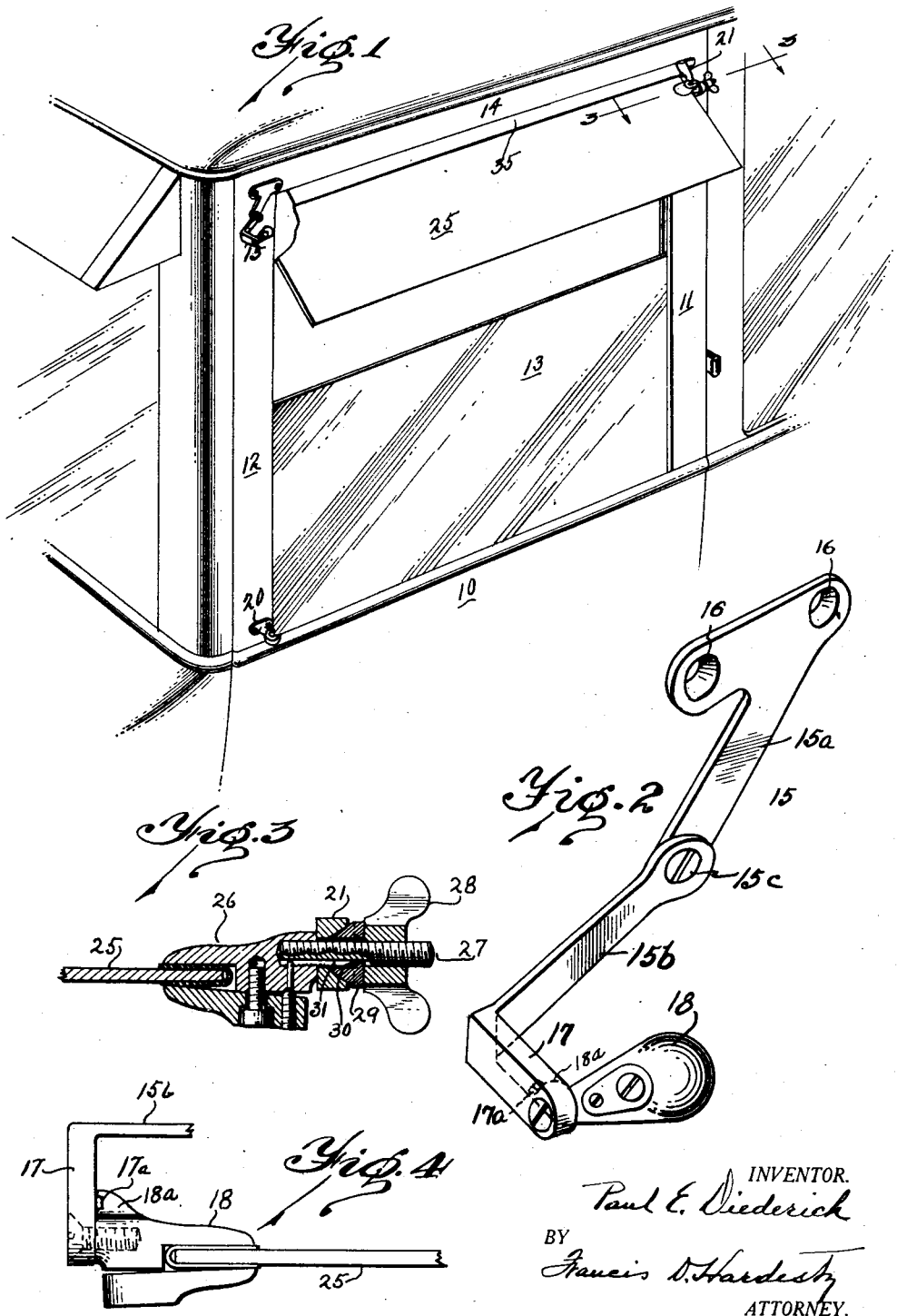

1,724,696

UNITED STATES PATENT OFFICE.

PAUL E. DIEDERICH, OF DETROIT, MICHIGAN, ASSIGNOR TO AMERICAN INJECTOR COMPANY, OF DETROIT, MICHIGAN, A CORPORATION OF MICHIGAN.

AIR DEFLECTOR.

Application filed July 28, 1926. Serial No. 125,384.

The present invention relates to air deflectors for automobiles and more especially to deflectors especially adapted for closed bodies.

Among the objects of the invention is an air deflector which may be utilized either as an air deflector in the usual manner or as a rain and sun shield.

Another object is the provision of a bracket for such devices, having the characteristic of pivoting in two distinct directions whereby the position of the shield may be changed without loosening the glass of the shield.

Reference is made to the accompanying drawing in which:

Fig. 1 is a perspective view of a portion of a closed automobile body with the device in use as a rain or sun shield.

Fig. 2 is a similar view of the front upper bracket.

Fig. 3 is a section on line 3—3 of Fig. 1.

Fig. 4 is a view of a portion of the bracket of Fig. 2.

In the drawings there is shown at 10 a door of an automobile having upright members 11 and 12 supporting and guiding a glass window 13, which members are connected at the top by a cross member 14.

Near the top of side member 12 is secured a bracket 15, shown more clearly in Fig. 2, and near the bottom of said member another bracket 20 in the form of a hook, while near the top of member 11 is a second hooked bracket 21.

As indicated, the bracket 15 consists of two main parts 15ª and 15ᵇ jointed at 15ᶜ so as to permit relative swinging of the two parts in a plane parallel to the planes thereof. Part 15ª is provided with screw holes 16 to permit securing the bracket to the window frame. Part 15ᵇ is provided with an arm 17 extending outwardly and to this arm is swiveled the glass clamp 18. Arm 17 also has a stop 17ª coacting with a projection 18ª on the clamp to limit the swiveling motion of the latter.

Clamp 18 is adapted to grip the end edge of a deflecting vane preferably a glass plate 25 and, through the two movable joints in bracket 15, this plate may be swung to the position shown in Fig. 1 or to a vertical position.

At the other end of glass 25 is another clamp 26 similar to clamp 18 and having a screw threaded stud 27 extending therefrom. This stud has thereon a wing nut 28 and a cone shaped member 29, which latter is provided with a tongue 30 adapted to slide in a suitable slot 31 in stud 27 so as to be prevented from turning.

The hook brackets 20 and 21 are each provided with a conical recess in one side to cooperate with the member 29 so that when the stud is placed in the hook and the nut 28 tightened, the member 29 enters this recess and makes a secure connection preventing swiveling of the glass.

It will readily be seen that by the means described the glass plate 25 may be easily and quickly changed from vertical front position to horizontal up position merely by loosening the nut 28 so as to remove the stud 27 from hook 20, swinging the glass upwardly and securing the stud in the hook of bracket 21, and that through the wedging action of member 29 the glass can be prevented from turning about the axis of the clamps.

It should be noted that the jointed arms of the parts 15ª and 15ᵇ of bracket 15 are placed at an angle to the horizontal and that joint 15ᶜ therefore is somewhat to the front of the clamp 18 when the glass 25 is vertical. Accordingly, when the glass is swung from the vertical to the horizontal position the end will move forward a short distance so as to be in advance of the side of the window. This is desirable to prevent entry of rain or glare through the angle between the front edge of glass 25 and member 12.

The brackets and clamps are so placed and the glass 25 so set in the clamps that, when the latter is in vertical position and turned to deflect air or rain outwardly, the narrow edge will be close to upright 12. In order to effectively prevent entrance of rain under these conditions, a rubber windshield strip is secured along this edge and pressed against member 12. This strip shown at 35, also effectively closes the top opening when the device is being used as a side visor.

The operation of the device appears to be obvious from its construction but attention is directed to the fact that in vertical position it may be used to deflect air into the vehicle or divert it to prevent entrance. In its horizontal position at the top of the window, if made of nontransparent material or colored glass it becomes an effective side visor or, by lifting the glass 13 to near the lower edge of plate 25, it becomes a ventilating eave, permitting entrance of air but excluding side glare or rain.

Now having described the invention and the preferred form of embodiment thereof, it is to be understood that the said invention is not to be limited to the specific details herein shown and described but only by the scope of the claims which follow.

I claim:—

1. An air deflector for the windows of automobile doors comprising a deflecting vane secured at its ends in a pair of clamps, one of said clamps being swiveled in a bracket at the upper front corner of the window, a second bracket at the lower front corner of the window to which the said swiveled clamp may be removably secured in either fixed or swiveling relation, and a third bracket near the upper rear corner of the window and similar to said second bracket, said first bracket being constructed and arranged to permit swinging of said vane to allow the securing of the said other clamp to either of said second or third brackets.

2. An air deflector for the windows of automobile doors comprising a deflecting vane swivel connected at one end to a bracket adapted to be mounted at the upper front corner of the window, other brackets near the lower front corner and upper rear corner of said window, said first bracket being jointed to allow swinging of the vane to permit its being connected at its other end to either of said other brackets.

PAUL E. DIEDERICH.